US012812429B2

(12) United States Patent
Liu et al.

(10) Patent No.: US 12,812,429 B2
(45) Date of Patent: Nov. 24, 2026

(54) DOPPLER SHIFT ESTIMATION AND REPORTING

(71) Applicant: LENOVO (BEIJING) LIMITED, Beijing (CN)

(72) Inventors: Bingchao Liu, Beijing (CN); Chenxi Zhu, Fairfax, VA (US)

(73) Assignee: LENOVO(BEIJING) LIMITED, Beijing (CN)

(*) Notice: Subject to any disclaimer, the term of this patent is extended or adjusted under 35 U.S.C. 154(b) by 395 days.

(21) Appl. No.: 18/249,849

(22) PCT Filed: Oct. 20, 2020

(86) PCT No.: PCT/CN2020/122141
§ 371 (c)(1),
(2) Date: Apr. 20, 2023

(87) PCT Pub. No.: WO2022/082422
PCT Pub. Date: Apr. 28, 2022

(65) Prior Publication Data
US 2023/0396346 A1 Dec. 7, 2023

(51) Int. Cl.
*H04B 17/24* (2015.01)
*H04B 17/364* (2015.01)
(Continued)

(52) U.S. Cl.
CPC ............ *H04W 24/10* (2013.01); *H04B 17/24* (2015.01); *H04B 17/364* (2015.01);
(Continued)

(58) Field of Classification Search
CPC .. H04B 7/02–12; H04B 17/0082–3913; H04L 5/0001–0098; H04W 4/30–38; H04W 8/22–245; H04W 24/02–10; H04W 36/0005–385; H04W 56/0005–0095; H04W 72/02–569;
(Continued)

(56) References Cited

U.S. PATENT DOCUMENTS

| | | | | |
|---|---|---|---|---|
| 2022/0376855 | A1* | 11/2022 | Zhang | H04W 24/10 |
| 2023/0141785 | A1* | 5/2023 | Manolakos | H04W 24/10 |
| 2023/0379739 | A1* | 11/2023 | Kim | H04W 24/10 |

FOREIGN PATENT DOCUMENTS

| | | | |
|---|---|---|---|
| WO | 2019097356 | A1 | 5/2019 |
| WO | 2019214663 | A1 | 11/2019 |
| WO | 2020032855 | A1 | 2/2020 |

OTHER PUBLICATIONS

International Search Report and Written Opinion dated Jun. 25, 2021 for International Application No. PCT/CN2020/122141.
(Continued)

*Primary Examiner* — Timothy J Weidner
(74) *Attorney, Agent, or Firm* — AMPACC Law Group, PLLC

(57) ABSTRACT

Methods and apparatuses for estimating and reporting Doppler shift are disclosed. A method comprises receiving a configuration of CSI Resource Setting associated with a CSI Report Setting for Doppler Shift reporting, wherein the CSI Resource Setting includes one or more TRS resources; estimating a Doppler shift for each of the TRS resources included in the Resource Setting; and transmitting the estimated Doppler shift(s) using a PUCCH or PUSCH resource.

15 Claims, 4 Drawing Sheets

(51) Int. Cl.

| | |
|---|---|
| ***H04W 24/08*** | (2009.01) |
| ***H04W 24/10*** | (2009.01) |
| ***H04W 56/00*** | (2009.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ....... *H04W 24/08* (2013.01); *H04W 56/0015* (2013.01); *H04W 56/0035* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 84/02–16; H04W 88/02–12; H04W 92/02–04; H04W 92/10
See application file for complete search history.

(56) References Cited

OTHER PUBLICATIONS

Spreadtrum Communications. “Remaining issues on CSI reporting”, 3GPP TSG RAN WG1 Meeting#93 R1-1806393, May 25, 2018; pp. 1-6.
Ericsson. “UE CSI Reporting Capability”, 3GPP TSG-RAN WG1 Meeting AH 1801 R1-1800698, Jan. 26, 2018; pp. 1-4.

* cited by examiner

DOPPLER SHIFT ESTIMATION AND REPORTING

CROSS REFERENCE TO RELATED APPLICATIONS

This application is a national phase entry of International Application No. PCT/CN2020/122141 filed Oct. 20, 2020, which is incorporated by reference in its entirety.

FIELD

The subject matter disclosed herein generally relates to wireless communications, and more particularly relates to methods and apparatuses for estimating and reporting Doppler shift.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal) (UE), High Speed Train (HST), Single Frequency Network (SFN), Transmission and Reception Point (TRP), base station (BS), Frequency Range 1 (FR1), Frequency Range 2 (FR2), Quasi Colocation (QCL), Medium Access Control (MAC), control element (CE), Synchronization Signal Block (SSB), Tracking Reference Signal (TRS), Physical Downlink Control Channel (PDCCH), Physical Downlink Shared Channel (PDSCH), Demodulation Reference Signal (DM-RS), Channel State Information (CSI), CSI Reference Signal (CSI-RS), Rank Indicator (RI), Precoding Matrix Indicator (PMI), Channel Quality Indicator (CQI), Non-Zero Power (NZP), Downlink control information (DCI), Physical Uplink Control Channel (PUCCH), Physical Uplink Shared Channel (PUSCH), CSI Processing Unit (CPU), subcarrier spacing (SCS).

For NR high speed train (HST), HST-SFN (single frequency network) deployment is the most important scenario, where all TRPs in the same cell transmit the same signals with the same time and frequency resources. The challenge in HST-SFN deployment scenario most comes from high Doppler shift caused by high speed (e.g., 500 km/hour), higher frequency (e.g., 2.6 GHz or 3.5 GHz) and the characteristics of SFN deployment. For example, the Doppler shift can reach up to about 1.2 kHz for 2.6 GHz and about 1.6 kHz for 3.5 GHz. When the train is located in the middle of two TRPs, the UEs in the train may simultaneously experience +1.6 kHz and −1.6 kHz Doppler shifts from TRPs from different directions. The significant difference of the Doppler shifts experienced simultaneously by the UE will cause great performance degradation. One important enhancement method is to enable Doppler shift pre-compensation at TRP side (i.e. at gNB side) for SFN-based DL transmission so that UE will not experience significant different Doppler shifts from different TRPs.

The aim of the present invention is to provide a solution of estimating and reporting Doppler shift to support Doppler shift pre-compensation at BS side.

BRIEF SUMMARY

Methods and apparatuses for estimating and reporting Doppler shift are disclosed.

In one embodiment, a method comprises receiving a configuration of CSI Resource Setting associated with a CSI Report Setting for Doppler Shift reporting, wherein the CSI Resource Setting includes one or more TRS resources; estimating a Doppler shift for each of the TRS resources included in the Resource Setting; and transmitting the estimated Doppler shift(s) using a PUCCH or PUSCH resource.

In one embodiment, the Doppler shift can be represented by a N-bits value in the range [ΔF, 0] and a 1-bit sign. For example, N may be equal to 7, and the 7-bits value has a (ΔF/128) Hz step size. A F can be the maximum Doppler shift in term of sub-carrier spacing without sign, and may be configured by RRC signaling.

In another embodiment, when the number of TRS resources included in the CSI Resource Setting is K, $O_{CPU}$=1 CPU or K CPUs are occupied for estimating and reporting K estimated Doppler shift(s), wherein K is a positive integer.

In another embodiment, a remote unit comprises a receiver that receives a configuration of CSI Resource Setting associated with a CSI Report Setting for Doppler Shift reporting, wherein the CSI Resource Setting includes one or more TRS resources; a processor that estimates a Doppler shift for each of the TRS resources included in the Resource Setting; and a transmitter that transmits the estimated Doppler shift(s) using a PUCCH or PUSCH resource.

In one embodiment, a method comprises transmitting a configuration of CSI Resource Setting associated with a CSI Report setting for Doppler Shift estimation and reporting, wherein the CSI Resource Setting includes one or more TRS resources; and receiving a PUCCH or PUSCH resource carrying an estimated Doppler shift for each of the TRS resources included in the CSI Resource Setting.

In some embodiment, the method may further comprise transmitting a CSI-RS resource with a frequency that has been compensated by each of the estimated Doppler shift(s), wherein each of the CSI-RS resource(s) is QCLed with a SSB with average delay. If applicable, each of the CSI-RS resource(s) is further QCLed with the SSB with spatial RX filter.

In some embodiment, the method may further comprise transmitting each of the TRS resource(s) with a frequency that has not been compensated. In addition, the method may further comprise transmitting DM-RS port(s) of SFN-PDCCH or SFN-PDSCH with a frequency that has been compensated by the Doppler shift, wherein the DM-RS port(s) are QCLed with the TRS resource(s) with Doppler spread, average delay, delay spread.

In yet another embodiment, a TRP comprises a transmitter that transmits a configuration of CSI Resource Setting associated with a CSI Report setting for Doppler Shift estimation and reporting, wherein the CSI Resource Setting includes one or more TRS resources; and a receiver that receives a PUCCH or PUSCH resource carrying an estimated Doppler shift for each of the TRS resources included in the CSI Resource Setting.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
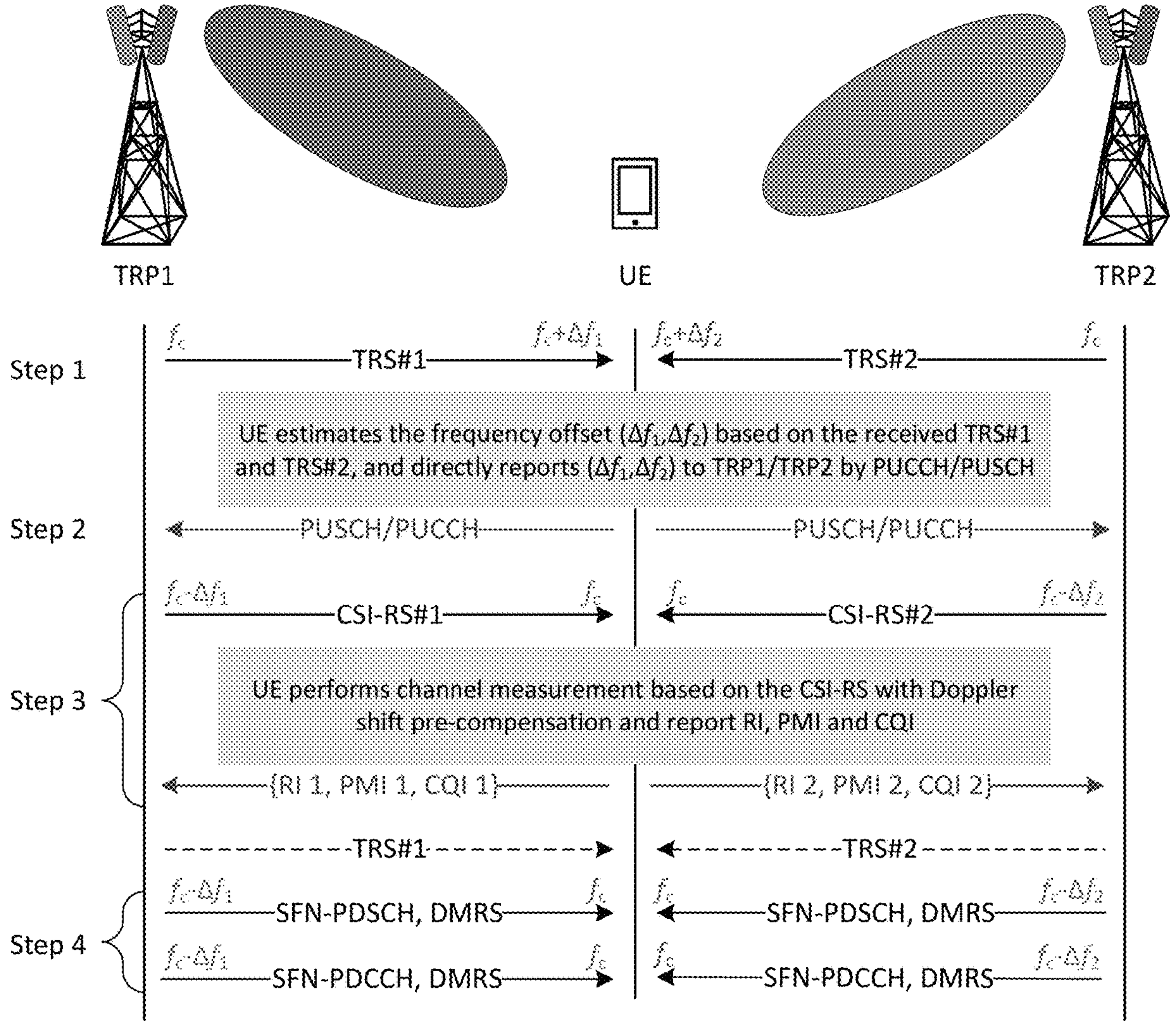
FIG. 1 illustrates a Doppler shift pre-compensation procedure according to a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

FIG. 1 illustrates a Doppler shift pre-compensation procedure according to a first embodiment. The directional lines represent the directions of the signals between TRP (TRP1 or TRP2) and UE, i.e. from TRP (TRP1 or TRP2) to UE or from UE to TRP (TRP1 or TRP2). The transmit frequencies of different signals are provided at the beginning side of each line and the receive frequencies of different signals are provided at the end side of each line.

It is assumed that a common local carrier frequency $f_c$ is known by TRP1, TRP2 and UE. TRP1 and TRP2 are located at different locations. For example, in scenario of high speed train (HST), TRP1 and TRP2 are located near the train rail, along which UE moves, at different locations.

Step 1: TRP1 and TRP2 transmit TRS #1 and TRS #2, respectively, with center frequency $f_c$. TRS #1 and TRS #2 are QCLed with two different SSB resources by QCL-TypeC, i.e., {Doppler shift, average delay} and, if applicable, by QCL-TypeD, i.e., {spatial Rx filter}. It means that the UE can obtain the Doppler shift and average delay of the wireless channel between TRP1 and the UE for the reception of TRS #1 from the estimation of a SSB resource QCLed with TRS #1, and if applicable, TRS #1 and the SSB resource are transmitted using the same spatial TX filter and can be received by using the same spatial RX filter. In addition, the UE can obtain the Doppler shift and average delay of the wireless channel between TRP2 and the UE for the reception of TRS #2 from the estimation of another SSB resource QCLed with TRS #2, and if applicable, TRS #2 and the other SSB resource are transmitted using the same spatial TX filter and can be received by using the same spatial RX filter. Due to Doppler effect, the receive frequency of TRS #1 becomes $f_c+\Delta f_1$ at the UE side; and the receive frequency of TRS #2 becomes $f_c+\Delta f_2$ at the UE side.

Step 2: The UE receives TRS #1 with $f_c+\Delta f_1$. Accordingly, the UE can estimate Doppler shift value $\Delta f_1$ according to the frequency for receiving TRS #1 ($f_c+\Delta f_1$) and the local carrier frequency $f_c$, and directly report $\Delta f_1$ to TRP1 by a PUCCH or PUSCH resource. Similarly, the UE receives TRS #2 with $f_c+\Delta f_2$. Accordingly, the UE can estimate Doppler shift value $\Delta f_2$ according to the frequency for receiving TRS #2 ($f_c+\Delta f_2$) and the local carrier frequency $f_c$, and directly report $\Delta f_2$ to TRP2 by PUCCH or PUSCH. The PUCCH or PUSCH resource carrying the estimated Doppler shift value $\Delta f_1$ is received by TRP #1, and the PUCCH or PUSCH resource carrying the estimated Doppler shift value $\Delta f_2$ is received by TRP #2.

The Doppler shift can be reported by using CSI framework. In order to support explicitly reporting Doppler shift, a new CSI report with the following reporting settings can be configured. One Resource Setting containing one or two CSI-RS resources in an NZP-CSI-RS-ResourceSet configured with higher layer parameter trs-info (which is used to identify a TRS) is configured for Doppler shift estimation and report. The configured Resource Setting (configured CSI Resource Setting) is associated with a CSI Report Setting for Doppler Shift reporting. The higher layer parameter reportQuantity of the CSI Report Setting is set to 'DopplerShift'.

The Doppler shift can be represented by a N-bits (e.g. 7-bits) value in the range [ΔF, 0] with (ΔF/128) Hz step size. ΔF can be indicated by the gNB according to the HST development. For example, ΔF may be the maximum Doppler shift in term of sub-carrier spacing without sign. For example, in a typical HST development for frequency of 3.5 GHz, when the speed is 500 km/hour, the maximum Doppler shift of 1.6 kHz can be indicated as ΔF. Alternatively, ΔF may be replaced by ΔF' (=ΔF/SCS), where SCS is the subcarrier spacing of the carrier for TRS transmission.

In addition to the 7-bits value to represent the amount of Doppler shift, additional 1 bit is required to indicate the sign of the reported Doppler shift. For example, "1" may represent that the reported Doppler shift is a positive value and "0" may represent that the reported Doppler shift is a negative value. Alternatively, it is obviously feasible that "0" represents a negative value and "1" represents a positive value.

If more than one TRS resource is configured in the Resource Setting, each of the more than one Doppler shift value is estimated based on each TRS resource. For example, two Doppler shift values, e.g., two Doppler shift values $\Delta f_1$ and $\Delta f_2$ are estimated if two TRS resources (e.g. TRS #1 and TRS #2) are configured in the Resource Setting, where a first Doppler shift value $\Delta f_1$ is estimated based on a first configured TRS resource (e.g. TRS #1) and a second Doppler shift value $\Delta f_2$ is estimated based on a second configured TRS resource (e.g. TRS #2).

Depending on the different quantities to be reported in one CSI report, one CPU (CSI Processing Unit) is occupied for processing and reporting one CSI Report or performing measurement on one CSI-RS resource in one CSI Report. Accordingly, for a CSI report with reportQuantity set to 'DopplerShift', when K is the number of TRS resources configured in the Resource Setting, $O_{CPU}$=1 CPU or K CPUs are occupied for processing and reporting K Doppler shift values by K CSI-RS resources when K estimated Doppler shift values are reported in one CSI report.

It can be seen from the above that one Doppler shift value can be reported with a fixed size 8 bits (i.e. 7-bits value and 1-bit sign) in one CSI report. Therefore, Doppler shift has fixed payload size and can be reported by a PUCCH or PUSCH resource.

If multiple Doppler shift values are configured to be reported in one CSI report, the multiple estimated Doppler shift values corresponding to different TRS resources should be reported in one PUCCH or PUSCH resource.

Step 3: Because the TRPs will pre-compensate the Doppler shift for any of PDCCH, PDSCH, and corresponding DM-RS transmissions, it is preferable for the UE to perform CSI measurement based on a set of CSI-RS resources also with a frequency that has been pre-compensated with Doppler shift for appropriate PDSCH scheduling. In step 3, TRP1 and TRP2 transmit two sets of CSI-RS resources, e.g. CSI-RS #1 and CSI-RS #2, respectively, with a frequency that has been pre-compensated with Doppler shift to the UE for CSI measurement. In particular, TRP1 transmits a set of CSI-RS resources, e.g. CSI-RS #1, with frequency $f_c$-$\Delta f_1$ to the UE. That is, the transmit frequency $f_c$-$\Delta f_1$ of CSI-RS #1 has been pre-compensated with Doppler shift $\Delta f_1$ between TRP1 and UE so that the UE will receive CSI-RS #1 with frequency $f_c$. The UE receives CSI-RS #1 with frequency $f_c$, computes CSI parameter set 1, e.g. {RI 1, PMI 1, CQI 1}, and reports the computed CSI parameter set 1 to TRP1 according to NR Release 15 CSI framework. Similarly, TRP2 transmits a set of CSI-RS resources, e.g. CSI-RS #2, with frequency $f_c$-$\Delta f_2$ to the UE. That is, the transmit frequency $f_c$-$\Delta f_2$ of CSI-RS #2 has been pre-compensated with Doppler shift $\Delta f_2$ between TRP2 and UE so that the UE will receive CSI-RS #2 with frequency $f_c$. The UE receives CSI-RS #2 with frequency $f_c$, and computes CSI parameter set 2, e.g. {RI 2, PMI 2, CQI 2}, and reports the computed CSI parameter set 2 to TRP2 according to NR Release 15 CSI framework. Different from CSI-RS without Doppler shift pre-compensation, each of the CSI-RS resources transmitted with a frequency that has been pre-compensated with Doppler shift can be only QCLed with a SSB resource by average delay and, if applicable by QCL-TypeD, i.e., {spatial Rx filter}.

Step 4: TRP1 transmits SFN-PDCCH, SFN-PDSCH and corresponding DM-RS by the compensated center frequency $f_c$-$\Delta f_1$. In addition, TRP2 transmits SFN-PDCCH, SFN-PDSCH and corresponding DM-RS by the compensated center frequency $f_c$-$\Delta f_2$.

If DM-RS is transmitted by SFN manner, i.e., the same DM-RS port(s) are transmitted by two TRPs (TRP1 and TRP2), two TCI states are indicated to the DM-RS port of SFN-PDCCH or the DM-RS port(s) assigned for SFN-PDSCH. The first TCI state contains TRS #1 with QCL-TypeE, i.e., {Doppler spread, average delay, delay spread}, and if applicable, with QCL-TypeD, i.e., {spatial Rx filter}. It means that the UE will apply the Doppler spread, average delay and delay spread obtained from the estimation of TRS #1 to the reception of DM-RS from TRP1, and if applicable, the DM-RS from TRP1 and the TRS #1 are transmitted using the same spatial TX filter and can be received by using the same spatial RX filter. The second TCI state contains TRS #2 with QCL-TypeE, i.e., {Doppler spread, average delay, delay spread}, and if applicable, with QCL-TypeD, i.e., {spatial Rx filter}. It means that the UE will apply the Doppler spread, average delay and delay spread obtained from the estimation of TRS #2 to the reception of DM-RS from TRP2, and if applicable, the DM-RS from TRP2 and the TRS #2 are transmitted using the same spatial TX filter and can be received by using the same spatial RX filter.

If DM-RS is transmitted by non-SFN manner, i.e., two different DM-RS port sets are assigned for the SFN-PDSCH transmitted by two TRPs (TRP1 and TRP2). The first DM-RS port set is transmitted from TRP1 and QCLed with TRS #1 by QCL-TypeE, i.e., {Doppler spread, average delay, delay spread}, and if applicable, with QCL-TypeD, i.e., {spatial Rx filter}. The second DM-RS port set is transmitted from TRP2 and QCLed with TRS #2 by QCL-TypeE, i.e., {Doppler spread, average delay, delay spread}, and if applicable, with QCL-TypeD, i.e., {spatial Rx filter}.

It can be seen that steps 3 and 4 in FIG. 1 are optional for Doppler shift pre-compensation procedure. In step 2, the Doppler shift $\Delta f_1$ is known by TRP1 and the Doppler shift $\Delta f_2$ is known by TRP2.

In scenario of high speed train (HST), the UE is moving at a high speed along the train rail. So, the Doppler shift between UE and TRP (e.g. TRP1 and TRP2) is always changing. Therefore, the Doppler shift pre-compensation procedure will be performed before each PDSCH or PDCCH transmission and the Doppler shift reporting may be performed periodically. The periodical performance of the Doppler shift reporting procedure depends on periodical transmission of aperiodic TRS resources (e.g. TRS #1 and TRS #2 in step 1). The estimation and feedback (report) of Doppler shift are performed periodically, which allows continuously tracking and compensating for Doppler shift between the TRPs and the UE, so that PDCCH and PDSCH can be transmitted almost free from Doppler shift.

Figure 2:
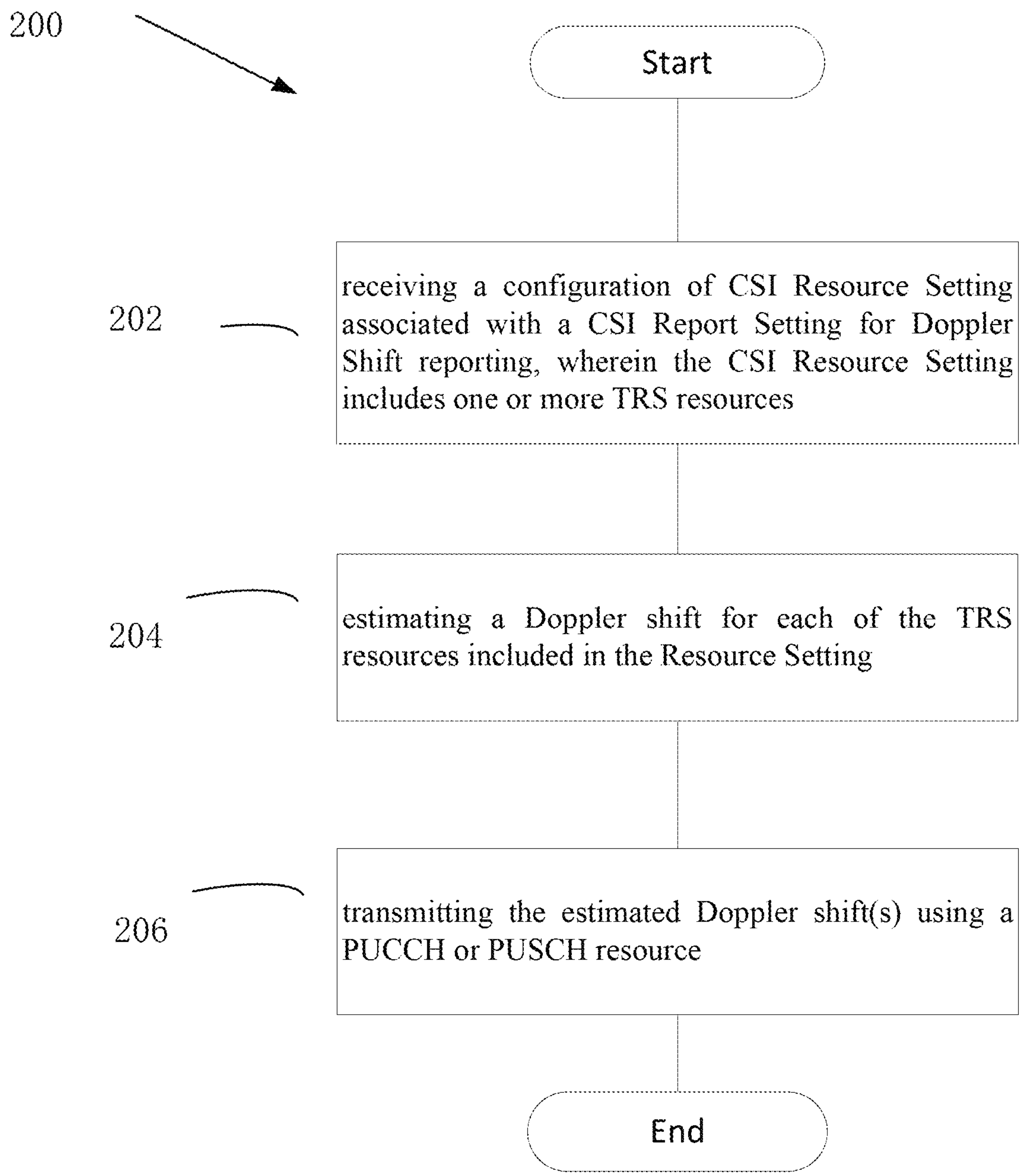
FIG. 2 is a schematic flow chart diagram illustrating an embodiment of a method.

FIG. 2 is a schematic flow chart diagram illustrating an embodiment of a method 200 according to the present application. In some embodiments, the method 200 is performed by an apparatus, such as a remote unit. In certain embodiments, the method 200 may be performed by a processor executing program code, for example, a microcontroller, a microprocessor, a CPU, a GPU, an auxiliary processing unit, a FPGA, or the like.

The method 200 may include 202 receiving a configuration of CSI Resource Setting associated with a CSI Report Setting for Doppler Shift reporting, wherein the CSI Resource Setting includes one or more TRS resources; 204 estimating a Doppler shift for each of the TRS resources included in the Resource Setting; and 206 transmitting the estimated Doppler shift(s) using a PUCCH or PUSCH resource.

In the method 200, the Doppler shift can be represented by a N-bits value in the range [ΔF, 0] and a 1-bit sign. For example, N may be equal to 7, and the 7-bits value has a (ΔF/128) Hz step size. ΔF can be the maximum Doppler shift in term of sub-carrier spacing without sign, and may be configured by RRC signaling.

When the number of TRS resources included in the CSI Resource Setting is K, $O_{CPU}$=1 CPU or K CPUs are occupied for estimating and reporting K estimated Doppler shift(s), wherein K is a positive integer.

The method 200 may further comprises receiving each of the TRS resource(s) transmitted with a frequency that has not been compensated by the Doppler shift. In addition, the method may further comprises receiving DM-RS port(s) of SFN-PDCCH or SFN-PDSCH transmitted with a frequency that has been compensated by the Doppler shift, wherein the DM-RS port(s) are QCLed with the TRS resource(s) with Doppler spread, average delay, delay spread.

Figure 3:
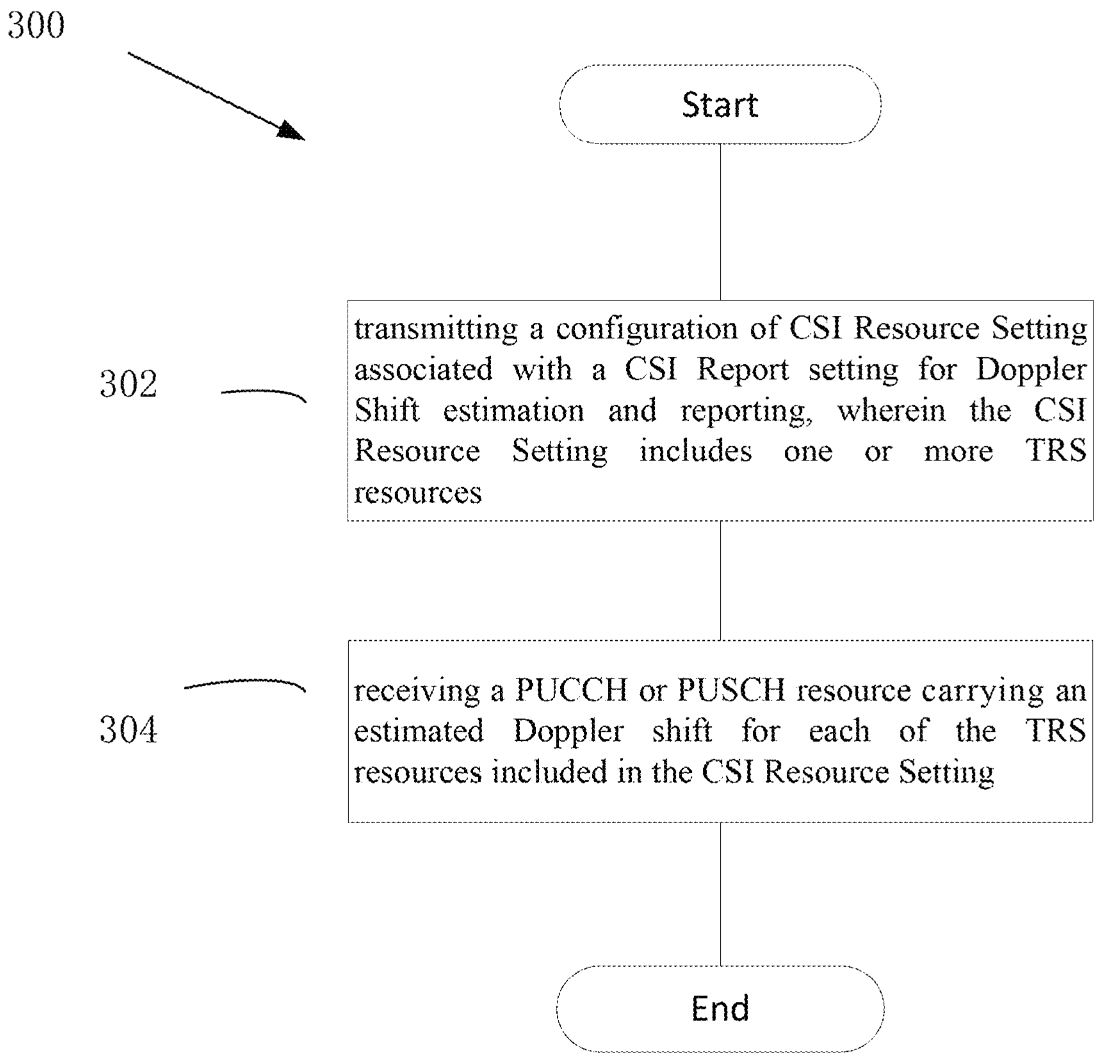
FIG. 3 is a schematic flow chart diagram illustrating a further embodiment of a method.

FIG. 3 is a schematic flow chart diagram illustrating an embodiment of a method 300 according to the present application. In some embodiments, the method 300 is performed by an apparatus, such as a base unit. In certain embodiments, the method 300 may be performed by a processor executing program code, for example, a microcontroller, a microprocessor, a CPU, a GPU, an auxiliary processing unit, a FPGA, or the like.

The method 300 may include 302 transmitting a configuration of CSI Resource Setting associated with a CSI Report setting for Doppler Shift estimation and reporting, wherein the CSI Resource Setting includes one or more TRS resources; and 304 receiving a PUCCH or PUSCH resource carrying an estimated Doppler shift for each of the TRS resources included in the CSI Resource Setting.

In the method 300, the Doppler shift can be represented by a N-bits value in the range [ΔF, 0] and a 1-bit sign. For example, N may be equal to 7, and the 7-bits value has a (ΔF/128) Hz step size. ΔF can be the maximum Doppler shift in term of sub-carrier spacing without sign, and may be configured by RRC signaling.

The method 300 may further comprise transmitting a CSI-RS resource with a frequency that has been compensated by each of the estimated Doppler shift(s), wherein each of the CSI-RS resource(s) is QCLed with a SSB with average delay. If applicable, each of the CSI-RS resource(s) is further QCLed with the SSB with spatial RX filter.

The method 300 may further comprise transmitting each of the TRS resource(s) with a frequency that has not been compensated. In addition, the method 300 may further comprise transmitting DM-RS port(s) of SFN-PDCCH or SFN-PDSCH with a frequency that has been compensated by the Doppler shift, wherein the DM-RS port(s) are QCLed with the TRS resource(s) with Doppler spread, average delay, delay spread.

Figure 4:
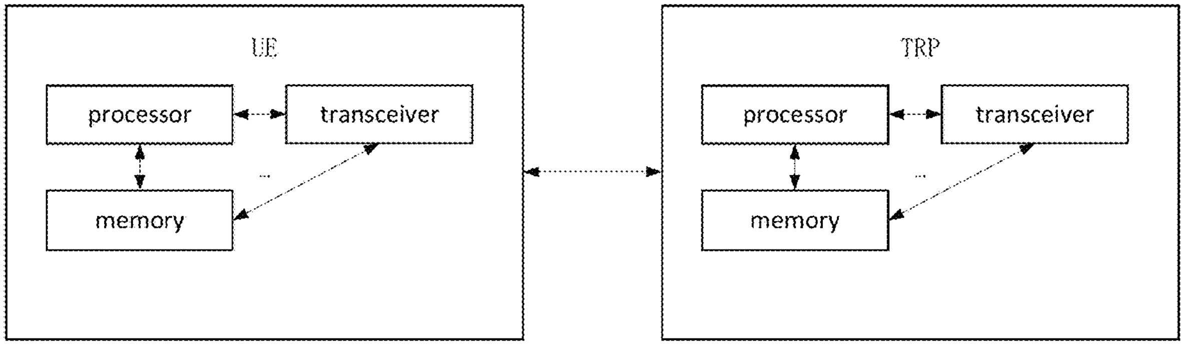
FIG. 4 is a schematic block diagram illustrating apparatuses according to one embodiment.

FIG. 4 is a schematic block diagram illustrating apparatuses according to one embodiment.

Referring to FIG. 4, the UE (i.e. the remote unit) includes a processor, a memory, and a transceiver. The processor implements a function, a process, and/or a method which are proposed in FIG. 2. In particular, the remote unit comprises: a receiver that receives a configuration of CSI Resource Setting associated with a CSI Report Setting for Doppler Shift reporting, wherein the CSI Resource Setting includes one or more TRS resources; a processor that estimates a Doppler shift for each of the TRS resources included in the Resource Setting; and a transmitter that transmits the estimated Doppler shift(s) using a PUCCH or PUSCH resource. In this manner, the Doppler shift is taken as a type of CSI for reporting, by using Release 15 CSI feedback framework. For example, one or two TRS resources can be included in the CSI Resource Setting associated with the CSI Report Setting for Doppler Shift reporting. The remote unit (UE) can estimate one or two Doppler shift values, each of which is estimated according to one of the one or two TRS resources.

The Doppler shift can be represented by a N-bits value in the range [ΔF, 0] and a 1-bit sign. For example, N may be equal to 7, and the 7-bits value has a (ΔF/128) Hz step size. ΔF can be the maximum Doppler shift in term of sub-carrier spacing without sign, and may be configured by RRC signaling. So, the Doppler shift has a fixed payload size, which can be reported by either PUCCH or PUSCH.

When the number of TRS resources included in the CSI Resource Setting is K, $O_{CPU}$=1 CPU or K CPUs are occupied for estimating and reporting K estimated Doppler shift(s), wherein K is a positive integer.

The receiver may further receive each of the TRS resource(s) transmitted with a frequency that has not been compensated by the Doppler shift. In addition, the receiver may further receive DM-RS port(s) of SFN-PDCCH or SFN-PDSCH transmitted with a frequency that has been compensated by the Doppler shift, wherein the DM-RS port(s) are QCLed with the TRS resource(s) with Doppler spread, average delay, delay spread. Accordingly, the SFN-PDCCH or SFN-PDSCH and corresponding DM-RS ports from one TRP can be transmitted with Doppler shift pre-compensation and are QCLed with a TRS from the same TRP without Doppler shift pre-compensation with the QCL parameters of Doppler spread, average delay and delay spread.

The TRP (i.e. base unit) includes a processor, a memory, and a transceiver. The processors implement a function, a process, and/or a method which are proposed in FIG. 3. In particular, the TRP includes a transmitter that transmits a configuration of CSI Resource Setting associated with a CSI Report setting for Doppler Shift estimation and reporting, wherein the CSI Resource Setting includes one or more TRS resources; and a receiver that receives a PUCCH or to PUSCH resource carrying an estimated Doppler shift for each of the TRS resources included in the CSI Resource Setting.

The Doppler shift can be represented by a N-bits value in the range [ΔF, 0] and a 1-bit sign. For example, N may be equal to 7, and the 7-bits value has a (ΔF/128) Hz step size. ΔF can be the maximum Doppler shift in term of sub-carrier spacing without sign, and may be configured by RRC signaling.

The transmitter may further transmit a CSI-RS resource with a frequency that has been compensated by each of the estimated Doppler shift(s), wherein each of the CSI-RS resource(s) is QCLed with a SSB with average delay. If applicable, each of the CSI-RS resource(s) is further QCLed with the SSB with spatial RX filter.

The transmitter may further transmit each of the TRS resource(s) with a frequency that has not been compensated. In addition, the transmitter may further transmit DM-RS port(s) of SFN-PDCCH or SFN-PDSCH with a frequency that has been compensated by the Doppler shift, wherein the DM-RS port(s) are QCLed with the TRS resource(s) with Doppler spread, average delay, delay spread.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A remote unit for wireless communication, comprising:
at least one memory; and
at least one processor coupled with the at least one memory and configured to cause the remote unit to:
receive a configuration of a channel state information (CSI) Resource Setting associated with a CSI Report Setting for Doppler shift reporting, wherein the CSI Resource Setting includes one or more tracking resource signal (TRS) resources;
estimate a Doppler shift for each of the one or more TRS resources included in the CSI Resource Setting, wherein the Doppler shift is represented by an N-bits value in a range [ΔF, 0] and a 1-bit sign;
occupy K CSI processing units (CPUs) for estimating and reporting K estimated Doppler shifts, where K is a positive integer greater than 1; and
transmit the estimated Doppler shift using a physical uplink control channel (PUCCH) resource or a physical uplink shared channel (PUSCH) resource.

2. The remote unit of claim 1, wherein Nis equal to 7 and the 7-bits value has a (ΔF/128) Hz step size.

3. The remote unit of claim 1, wherein ΔF is a maximum Doppler shift in term of sub-carrier spacing without a sign, and is configured by radio resource control (RRC) signaling.

4. The remote unit of claim 1, wherein the at least one processor is further configured to cause the remote unit to:
receive each of the one or more TRS resources transmitted with a frequency that has not been compensated by the Doppler shift.

5. The remote unit of claim 4, wherein the at least one processor is further configured to cause the remote unit to:
receive one or more demodulation reference signal (DM-RS) ports of a signal frequency network physical downlink control channel (SFN-PDCCH) or a signal frequency network physical downlink shared channel (SFN-PDSCH) transmitted with a frequency that has been compensated by the Doppler shift, wherein the one or more DM-RS ports are Quasi Colocationed (QCLed) with the one or more TRS resources with a Doppler spread, an average delay, or a delay spread.

6. A transmission and reception point (TRP) for wireless communication, comprising:
at least one memory; and
at least one processor coupled with the at least one memory and configured to cause the TRP to:
transmit a configuration of a channel state information (CSI) Resource Setting associated with a CSI Report setting for Doppler Shift estimation and reporting, wherein the CSI Resource Setting includes one or more tracking reference signal (TRS) resources;
receive a physical uplink control channel (PUCCH) or physical uplink shared channel (PUSCH) resource carrying an estimated Doppler shift for each of the one or more TRS resources included in the CSI Resource Setting; and
transmit one or more CSI reference signal (CSI-RS) resources with a frequency that has been compensated by the estimated Doppler shift for each of the one or more TRS resources, and wherein each of the one or more CSI-RS resources is Quasi Colocationed (QCLed) with a synchronization signal block (SSB) with average delay.

7. The TRP of claim 6, wherein each of the CSI-RS resources is further QCLed with the SSB with a spatial reception (RX) filter.

8. The TRP of claim 6, wherein the at least one processor is further configured to cause the TRP to:
transmit each of the one or more TRS resources with a frequency that has not been compensated.

9. The TRP of claim 8, wherein the at least one processor is further configured to cause the TRP to:
transmit one or more demodulation reference signal DM-RS ports of signal frequency network physical downlink control channel (SFN-PDCCH) or signal frequency network physical downlink shared channel (SFN-PDSCH) with a frequency that has been compensated by the Doppler shift, wherein the one or more DM-RS ports are Quasi Colocationed (QCLed) with the one or more TRS resources with a Doppler spread, an average delay, or a delay spread.

10. A method performed by a remote unit, the method comprising:
receiving a configuration of a channel state information (CSI) Resource Setting associated with a CSI Report Setting for Doppler shift reporting, wherein the CSI Resource Setting includes one or more tracking resource signal (TRS) resources;

estimating a Doppler shift for each of the one or more TRS resources included in the CSI Resource Setting;

transmitting the estimated Doppler shift using a physical uplink control channel (PUCCH) resource or a physical uplink shared channel (PUSCH) resource; and receiving one or more demodulation reference signal (DM-RS) ports of a signal frequency network physical downlink control channel (SFN-PDCCH) or a signal frequency network physical downlink shared channel (SFN-PDSCH) transmitted with a frequency that has been compensated by the Doppler shift, wherein the one or more DM-RS ports are Quasi Colocationed (QCLed) with the one or more TRS resources with a Doppler spread, an average delay, or a delay spread.

11. The method of claim 10, wherein the Doppler shift is represented by an N-bits value in the range [ΔF, 0] and a 1-bit sign.

12. The method of claim 11, wherein N is equal to 7, and the 7-bits value has a (ΔF/128) Hz step size.

13. The method of claim 12, wherein ΔF is a maximum Doppler shift in term of sub-carrier spacing without a sign, and is configured by radio resource control (RRC) signaling.

14. The method of claim 10, wherein, when a number of the one or more TRS resources included in the CSI Resource Setting is K, $O_{CPU}$=1 CSI processing unit (CPU) or K CPUs are occupied for estimating and reporting K estimated Doppler shifts, and wherein K is a positive integer.

15. The method of claim 10, further comprising:

receiving each of the one or more TRS resources transmitted with a frequency that has not been compensated by the Doppler shift.

* * * * *